(12) United States Patent
Osada (10) Patent No.: US 6,877,235 B2
(45) Date of Patent: *Apr. 12, 2005

(54) CUTTING MECHANISM FOR A SABER SAW (75) Inventor: Yoshio Osada, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/649,628

(22) Filed: Aug. 28, 2003

(65) Prior Publication Data

US 2004/0040162 A1 Mar. 4, 2004

Related U.S. Application Data (63) Continuation of application No. 09/817,189, filed on Mar. 27, 2001, now Pat. No. 6,634,107, which is a continuation-in-part of application No. 09/468,127, filed on Dec. 21, 1999, now Pat. No. 6,282,797.

(30) Foreign Application Priority Data

Mar. 12, 1999 (JP) .............................. 11-67109
Sep. 8, 2000 (JP) ..................... P2000-272388

(51) Int. Cl.[7] .......................... B27D 19/00; B23D 49/04
(52) U.S. Cl. ............................... 30/394; 30/392; 74/57
(58) Field of Search .......................... 30/392–394, 275; 83/646, 697, 699.21; 173/114, 205, 162.1, 176, 178; 74/50, 60, 57

(56) References Cited

U.S. PATENT DOCUMENTS

| | | |
|---|---|---|
| 3,204,470 A * | 9/1965 | Brucker .......................... 74/50 |
| 3,269,197 A | 8/1966 | Enders |
| 3,461,732 A | 8/1969 | Gregory |
| 3,802,079 A | 4/1974 | Ketchpel et al. |
| 3,945,120 A | 3/1976 | Ritz |
| 4,628,605 A | 12/1986 | Clowers |
| 5,025,562 A | 6/1991 | Palm |
| 5,050,307 A | 9/1991 | Palm |
| 5,402,580 A | 4/1995 | Seto et al. |
| 5,479,711 A | 1/1996 | Hathcock |
| 5,555,626 A | 9/1996 | Fuchs |
| 5,566,458 A | 10/1996 | Bednar |
| 5,607,023 A | 3/1997 | Palm |
| 5,689,891 A | 11/1997 | Bednar |
| 5,725,058 A | 3/1998 | Eriksson |
| 5,782,000 A | 7/1998 | Bednar |
| 5,940,977 A | 8/1999 | Moores, Jr. |
| 6,012,346 A | 1/2000 | Vo |
| 6,047,477 A | 4/2000 | Di Nicolantonio |
| 6,212,781 B1 * | 4/2001 | Marinkovich et al. ......... 30/394 |
| RE37,211 E | 6/2001 | Bednar |
| 6,276,065 B1 * | 8/2001 | Osada et al. ................... 30/392 |
| 6,282,797 B1 | 9/2001 | Osada et al. |
| 6,508,151 B1 * | 1/2003 | Neitzell ......................... 83/34 |
| 6,634,107 B2 * | 10/2003 | Osada ............................ 30/392 |
| 6,742,267 B2 * | 6/2004 | Marinkovich et al. ......... 30/394 |

FOREIGN PATENT DOCUMENTS

| | | |
|---|---|---|
| JP | 51-130983 | 11/1976 |
| JP | 2860173 | 12/1998 |
| JP | 2000-263504 | 9/2000 |
| WO | WO 98/07544 | 2/1998 |

* cited by examiner

Primary Examiner—Boyer D. Ashley
(74) Attorney, Agent, or Firm—Sughrue Mion, PLLC

(57) ABSTRACT

A counterweight is provided to cancel axial vibration of a plunger of a saber saw. Swing rollers, rotatably supported at both ends of a roller shaft provided at a rear end of the plunger, are interposed between a pair of opposing tracks formed in an axially elongated groove formed on the counterweight.

14 Claims, 8 Drawing Sheets

CUTTING MECHANISM FOR A SABER SAW

CROSS REFERENCE TO RELATED APPLICATION

This application is a continuation of application Ser. No. 09/817,189 filed on Mar. 27, 2001 now U.S. Pat. No. 6,634,107, which is a continuation-in-part of the application Ser. No. 09/468,127 filed on Dec. 21, 1999 (now U.S. Pat. No. 6,282,797)

BACKGROUND OF THE INVENTION

The present invention relates to saber saws. Various saber saws have been conventionally developed to cut or saw woody or steel materials or pipes in the housing or building construction sites or similar fields.

Conventional saber saws are basically classified into first and second types. According to a saber saw of the first type, a saw blade is reciprocated along a linear path. According to a saber saw of the second type, a saw blade is moved along an orbital path, for example, an elliptic path. The second type is also referred to as the orbital cutting type.

U.S. Pat. No. 3,945,120 discloses a vibration dampening and heat sink mechanism for a reciprocating hand-held saw which has a carrier guide with limited axial and radial movement positively controlled by an eccentric.

The conventional saber saws of the orbital cutting type, for example disclosed in U.S. Pat. No. 3,945,120 and in U.S. Pat. No. 3,461,732, are preferable to cut relatively soft material, such as woody members.

In general, reciprocative movement of the saber saws cause axial vibration. Providing a counterweight is effective to suppress such vibrations (refer to U.S. Pat. Nos. 5,025,562 and 5,555,626).

SUMMARY OF THE INVENTION

An object of the present invention is to provide a saber saw of the orbital cutting type which can operate properly even when a saw blade is inversely attached to a saber saw body while suppressing vibration.

In order to accomplish this and other related objects, the present invention provides a saber saw including a housing, a driven shaft, a plunger, a first motion converting mechanism, a counterweight, a second motion converting mechanism, a guide sleeve, a swing roller, a pivot member, and means for pivoting the guide sleeve. The housing accommodates therein a motor. The driven shaft is rotatably supported by the housing and rotated by said motor. The plunger is capable of reciprocative motion with respect to said housing and has a front end to which a saw blade is attached. The plunger extends in its axial direction. The first motion converting mechanism is interposed between the driven shaft and the plunger for converting rotational motion of the driven shaft into the reciprocative motion of the plunger. The counterweight causes reciprocative motion with respect to the housing. The second motion converting mechanism is interposed between the driven shaft and the counterweight for converting the rotational motion of the driven shaft into the reciprocative motion of the counterweight. The guide sleeve extends in the axial direction of the plunger. The swing roller is movable along the guide sleeve and is reciprocally movable together with the plunger. The pivot member extends in a direction perpendicular to the guide sleeve. The guide sleeve is pivotally movable about an axis of the pivot member. The pivoting means is adapted for pivoting the guide sleeve within a predetermined angle about the axis of the pivot member.

In another aspect of the invention, there is provided a saber saw including the housing, the driven shaft, the plunger, the first motion converting mechanism, the counterweight, the second motion converting mechanism, the guide sleeve, the swing roller, the pivot member, and a moving mode changing means for changing a moving mode of the guide sleeve between a first moving mode for pivotally moving the guide sleeve about an axis of the pivot member within a predetermined pivot angle and a second moving mode for preventing the guide sleeve from being pivotally moved about the pivot member.

In still another aspect of the invention, there is provided a saber saw including the housing, the driven shaft, the plunger, the first motion converting mechanism, the counterweight, the second motion converting mechanism, and a swing roller. The counterweight provides a first track and a second track each extending in an reciprocating direction of the plunger. The swing roller is reciprocally movable together with the plunger along the extending direction of the first and second tracks. A combination of the first track, the second track and the swing roller selectively provides one of a first mode in which the swing roller is reciprocally moved out of contact from the first track and the second track, a second mode in which the swing roller is reciprocally moved in contact with the first track, and a third mode in which the swing roller is reciprocally moved in contact with the second track.

In still another aspect of the invention, there is provided a saber saw including the housing, the driven shaft, the plunger, the first motion converting mechanism, the counterweight causing reciprocative motion with respect to the housing, the second motion converting mechanism, the guide sleeve, and the swing roller movable along the guide sleeve and reciprocally movable together with the plunger. A combination of the plunger and the guide sleeve selectively provides one of a first mode in which the plunger is linearly reciprocally movable along the guide sleeve and a second mode in which the plunger is pivotally moved within a pivot angle ranging from 0.44 degrees to 1.54 degrees upon pivotal movement of the guide sleeve.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENTS

Figure 1:
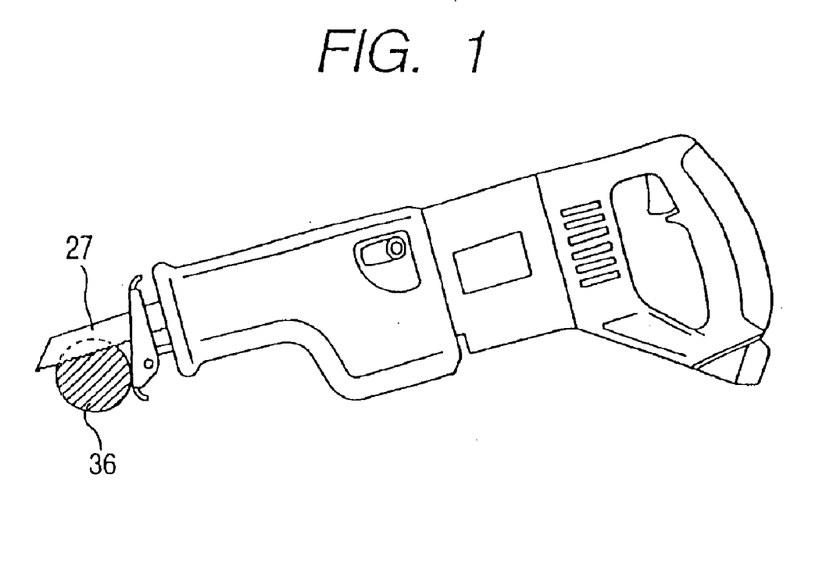
FIG. 1 is a side view showing a cutting operation of a saber saw.
Figure 2:
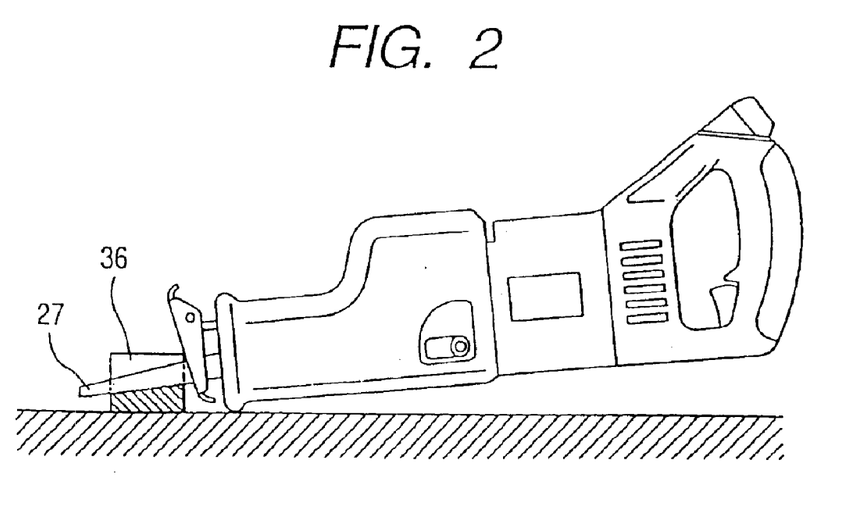
FIG. 2 is a side view showing another cutting operation of a saber saw.
Figure 3:
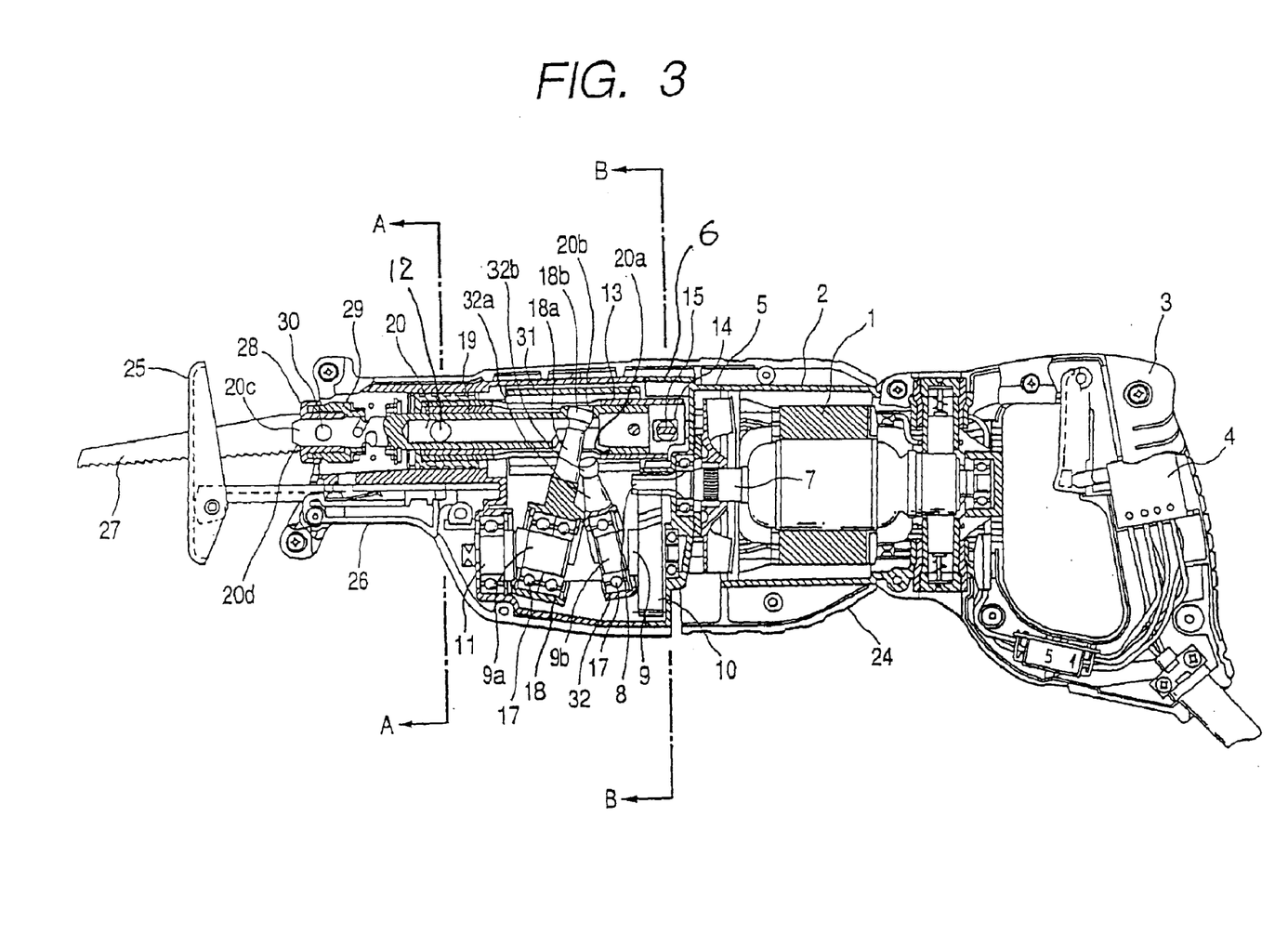
FIG. 3 is a partly cross-sectional view showing a saber saw in accordance with a preferred embodiment of the present invention.

FIG. 1 shows an ordinary cutting operation of a saber saw according to which a saw blade 27 with facedown sawteeth is attached to the front end of a saber saw body held in a normal position. FIG. 2 shows another condition of a saber saw according to which the saw blade 27 is inversely attached to the saber saw body. However, the above-described conventional saber saws of the orbital cutting type cannot operate properly if saw blades are inversely attached to saber saw body as shown in FIG. 2.

The applicant's copending application Ser. No. 09/468, 127 discloses a saber saw of the orbital cutting type which can operate properly even when a saw blade is inversely attached to a plunger or a carrier.

PCT international publication No. WO 98/07544 discloses a saber saw that approaches the better cutting performance of orbital saws without the complexity required for orbital motion and achieves a forward motion of the saw blade during the cutting stroke without resorting to orbital motion. The PCT international publication is patented as U.S. Pat. No. 6,508,151.

Preferred Embodiment

A preferred embodiment of the present invention will be explained with reference to FIGS. 3 to 18. Identical parts are denoted by the same reference numerals throughout the views. The directions used in the following explanation are defined based on a saber saw held in a normal position with a longitudinal axis extending in a horizontal direction.

Motor Section

An electrically driven motor 1 is accommodated in a resin-made motor housing 2. A handle 3 is connected to the rear end of the motor housing 2. The handle 3 is equipped with a switch 4 which allows a user to on-and-off control power supply to the electric motor 1.

Speed-Reducing Mechanism

An inner cover 5, which is an aluminum product, is connected to the front end of the motor housing 2. A gear cover 6, which is also an aluminum product, is connected to the front end of the inner cover 5 for accommodating a driving force transmitting mechanism which is described later. The electric motor 1 has a motor shaft 7 serving as a rotary member outputting a rotational driving force of the electric motor 1. A driving gear 8 is formed at the front end of the motor shaft 7. A secondary shaft 9 is positioned in parallel with the motor shaft 7. The inner cover 5 supports the front end of motor shaft 7 and the rear end of secondary shaft 9. A driven gear 10 is attached on the secondary shaft 9 so as to mesh with the driving gear 8. The driving gear 8 and the driven gear 10 cooperate as a speed reducing mechanism. The rotational force of electric motor 1 is transmitted to the secondary shaft 9 via the speed reducing mechanism. The secondary shaft 9 rotates at a reduced speed.

A first slant shaft portion 9a is formed at the front end of the secondary shaft 9. The first slant shaft portion 9a inclines with respect to the secondary shaft 9. A second slant shaft portion 9b is formed at the rear end of the secondary shaft 9. The second slant shaft portion 9b inclines with respect to the secondary shaft 9 so as to have opposite phase relationship with respect to the first slant shaft portion 9a. The first slant shaft portion 9a and the second slant shaft portion 9b cooperate to cause a plunger 20 and a counterweight 31 to reciprocate in opposed directions with a phase difference of 180 degrees.

A sub shaft 11 is attached to the front end of the secondary shaft 9. The sub shaft 11 is coaxial with the secondary shaft 9. The motor housing 2, the inner cover 5, and the gear cover 6 cooperatively constitute a housing of the saber saw.

Reciprocating Shaft Supporting Structure

Figure 4:
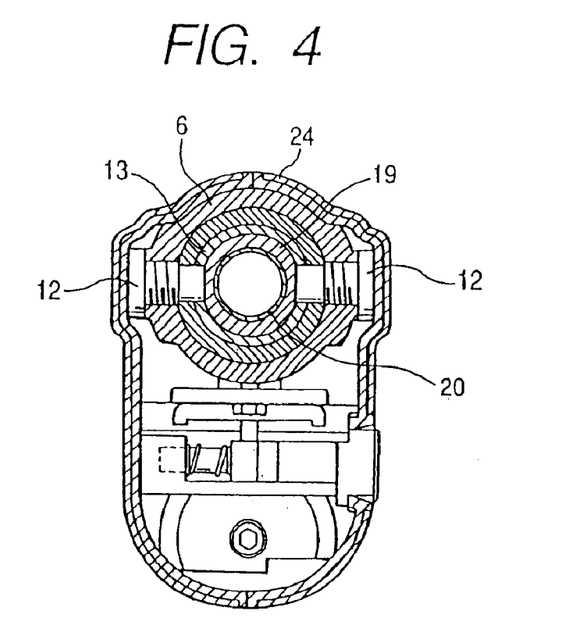
FIG. 4 is a cross-sectional view taken along a line A—A of FIG. 3.
Figure 5:
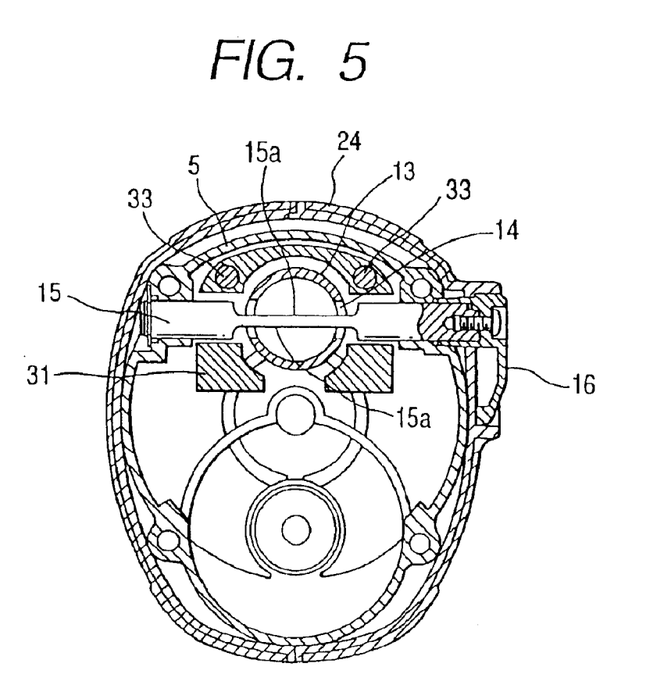
FIG. 5 is a cross-sectional view taken along a line B—B of FIG. 3.
Figure 6:
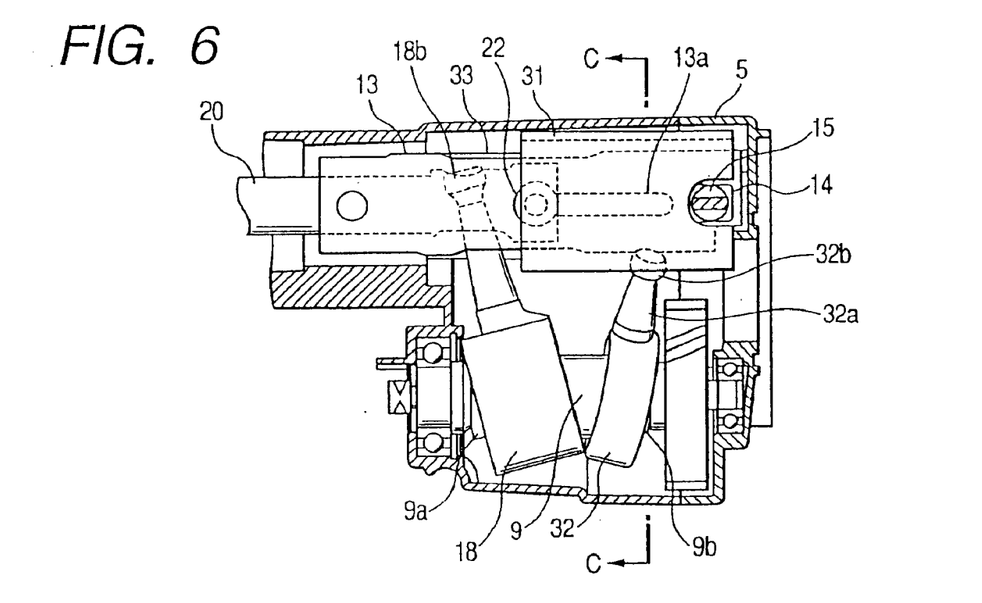
FIG. 6 is a cross-sectional view showing essential arrangement of a cutting mechanism of the present invention.

As shown in FIG. 4, two axle bolts 12 are opposed and coaxially attached to the front end of the gear cover 6. A guide sleeve 13 is hingedly supported at the inner ends of the axle bolts 12 and is swingable about the common axis of the axle bolts 12. The common axis of the axle bolts 12 serves as a pivot for allowing the guide sleeve 13 to swing in an up-and-down direction normal to a reciprocating direction of the plunger 20. As shown in FIG. 5, two opposed rectangular through holes 14 are opened at the rear end of the guide sleeve 13. A change shaft 15 is rotatably installed on the inside wall of the inner cover 5. The change shaft 15 is inserted into the rectangular through holes 14. More specifically, the change shaft 15 has two symmetric flat surfaces 15a formed at opposite sides of the central region thereof. The flat surfaces 15a extend in a wider lateral region larger than the diameter of the guide sleeve 13. A change lever 16 is securely connected to the axial end of the change shaft 15. The change shaft 15 rotates in accordance with a turning operation of the change lever 16. The rotation of the change shaft 15 selectively allows or restricts the swing motion of the guide sleeve 13 about the pivot thereof. FIG. 5 shows the guide sleeve 13 which is released from restriction of the change shaft 15 and swingable within a predetermined angular range.

Rotation-Reciprocation Converting Mechanism (for Plunger)

A first wobble plate 18 has a sleeve like base portion coupled around the first slant shaft portion 9a via two bearing rings 17. The first wobble plate 18 has a swing shaft 18a integrally extending from the sleeve like base portion in a direction perpendicular to the axis of the first slant shaft portion 9a. A ball portion 18b is formed at the distal end of the swing shaft 18a. A cylindrical bearing metal 19 is press fitted into the front end portion of the cylindrical guide sleeve 13. The plunger 20 reciprocates along the cylindrical inner wall of the bearing metal 19. The plunger 20 has a larger-diameter portion 20a at the rear end thereof. A slight clearance is provided between the larger-diameter portion 20a and the cylindrical inner wall of the guide sleeve 13. The swing shaft 18a of the first wobble plate 18 is inserted into upper and lower openings formed on the larger-diameter portion 20a of the plunger 20. An upper opening 20b of the larger-diameter portion 20a is loosely coupled with the ball portion 18b of the swing shaft 18a. The ball portion 18b can roll along the cylindrical edge of the upper opening 20b. The lower opening of the larger-diameter portion 20a is so wide that the swing movement of the swing shaft 18a is not blocked by the lower opening of the larger-diameter portion 20a. With the above-described arrangement, the rotational motion of the secondary shaft 9 is converted into reciprocative motion of the plunger 20.

Counterweight Holding Mechanism

The counterweight 31, supported by two guide shafts 33, reciprocates in the same direction as that of the plunger 20. Each of the guide shafts 33 has both ends fixedly supported by the inner cover 5 and the gear cover 6. The counterweight 31 is a sleeve like member surrounding the guide sleeve 13. The centroid of the counterweight 31 agrees with that of the plunger 20 (refer to FIGS. 5 and 6).

Rotation-Reciprocation Converting Mechanism (for Counterweight)

A second wobble plate 32 has a sleeve like base portion coupled around the second slant shaft portion 9b via a single bearing ring 17. The second wobble plate 32 has a swing shaft 32a integrally extending from the sleeve like base portion in a direction perpendicular to the axis of the second slant shaft portion 9b. A ball portion 32b is formed at the distal end of the swing shaft 32a (refer to FIG. 3).

Figure 7:
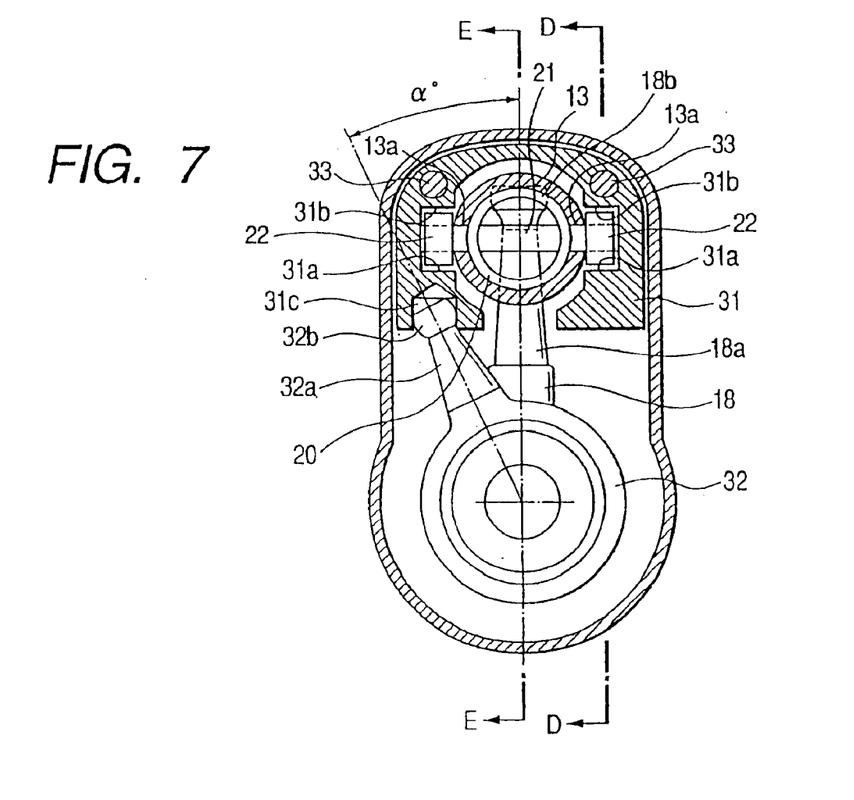
FIG. 7 is a cross-sectional view taken along a line C—C of FIG. 6.

To avoid interference between the ball portion 18b and the ball portion 32b, the swing shaft 32a of the second wobble plate 32 is angularly offset by an offset angle a degree with respect to the swing shaft 18a of the first wobble plate 18 when seen from the axial end of the secondary shaft 9 as shown in FIG. 7. The inclination angle of each of the first slang-slant shaft 9a and the second slant shaft 9b with respect to the secondary shaft 9 is determined considering the offset angle a degree so that the plunger 20 and the counterweight 31 can cause reciprocative motions opposed to each other with a phase difference of 180 degrees. More specifically, each inclination angle with respect to an axis of the driven gear 10 is maximized at the position corresponding to the offset angle a degrees. A bore 31c, provided on the counterweight 31, is loosely coupled with the ball portion 32b of the second wobble plate 32. The ball portion 32b can roll along the cylindrical edge of the bore 31c. With this arrangement, the rotational motion of the secondary shaft 9 is converted into the reciprocative motion of the counterweight 31 (refer to FIG. 7).

Vibration of the plunger 20 caused in its axial direction can be canceled by the reciprocative motion of the counterweight 31 when a product of mass and stroke of the counterweight 31 is identical with that of the plunger 20.

Blade Attaching & Detaching Mechanism

A blade attaching portion 20c is formed at the front end of the plunger 20. The blade attaching portion 20c comprises a slit 20d into which the saw blade 27 is inserted and locked by a stepped blade locking pin 30. Cylindrical blade holders 28 and 29 are provided around the blade attaching portion 20c. The blade holder 28 is axially shiftable toward the rear end of the plunder 20 while it rotates against a resilient force. The stepped blade locking pin 30 retracts in response to the axially rearward and rotational movement of the blade holder 28. This mechanism allows the user to insert the saw blade 27 into the slit 20d when the user holds the blade holder 28 at the rearward position. When released, the blade holder 28 shifts in the axially forward direction and returns its home position while it rotates in the opposite direction. With this returning motion, the stepped blade locking pin 30 engages the saw blade 27 and firmly fixes the saw blade 27 in the slit 20d of the plunger 20. Regarding the direction of the saw blade 27, this blade holding mechanism allows the user to set the saw blade 27 upside down when attaching it to the blade attaching portion 20c of the plunger 20. The applicants' earlier U.S. patent application Ser. No. 09/426, 646 filed Oct. 25, 1999 (now patented as U.S. Pat. No. 6,276,065 discloses the more detailed structure for the blade attaching and detaching mechanism.

Front Holding Structure

A resin-made front cover 24 partly covers the housing of the saber saw, i.e., the motor housing 2, the inner cover 5 and the gear cover 6. A base 25 is attached to the front end of the gear cover 6 and is shiftable in the axial direction via a fixing lever 26. The base 25 stabilizes the position of the saber saw with respect to a material 36 to be cut by the saber saw.

Swing Sawing Mechanism

A roller shaft 21 is provided at the rear part of plunger 20 and loosely coupled in axially elongated holes 13a opened on the guide sleeve 13. The roller shaft 21 has both ends rotatably supporting swing rollers 22 thereabout. The axially elongated holes 13a guide the roller shaft 21 and the swing rollers 22 to reciprocate together with the plunger 20. An altitudinal width of each elongated hole 13a is slightly larger than a diameter of the roller shaft 21. The guide sleeve 13 and the roller shaft 21 cooperatively prevent the plunger 20 from rotating in the circumferential direction, thereby providing an antiroll mechanism for the saw blade 27.

Each of the swing rollers 22 is located between a pair of opposing surfaces, i.e., lower track 31a and upper track 31b, of an axially elongated groove formed in the counterweight 31. These tracks 31a and 31b extend in the axial direction of the plunger 20 with a longitudinal length longer than a sum of respective strokes of plunger 20 and counterweight 31 (refer to FIGS. 7 and 8). To adjust a swing motion of the plunger 20, each of the lower track 31a and the upper track 31b is slightly inclined as shown in FIG. 8.

Figure 8:
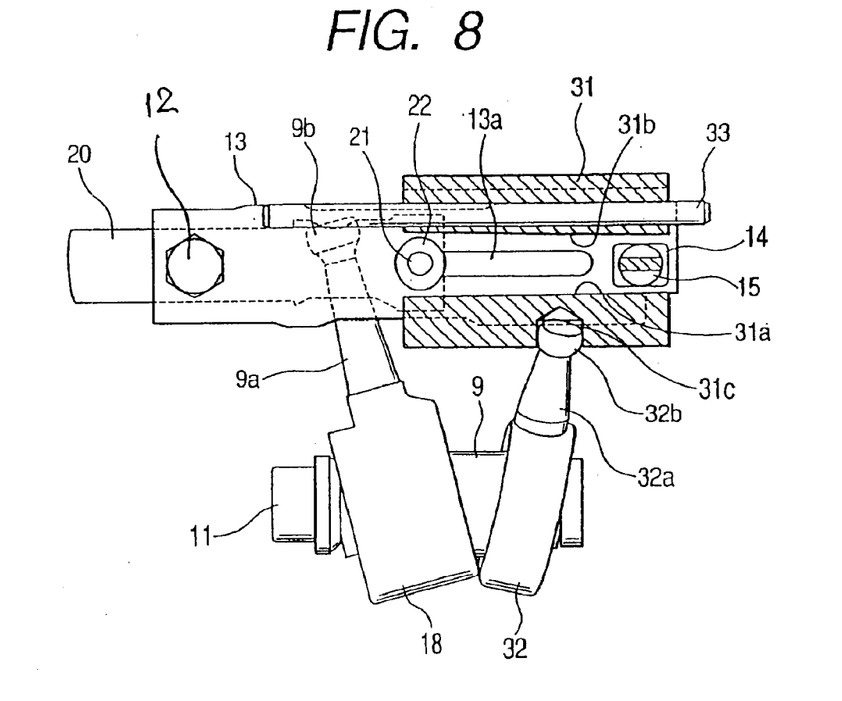
FIG. 8 is a cross-sectional view taken along a line D—D of FIG. 7.
Figure 9:
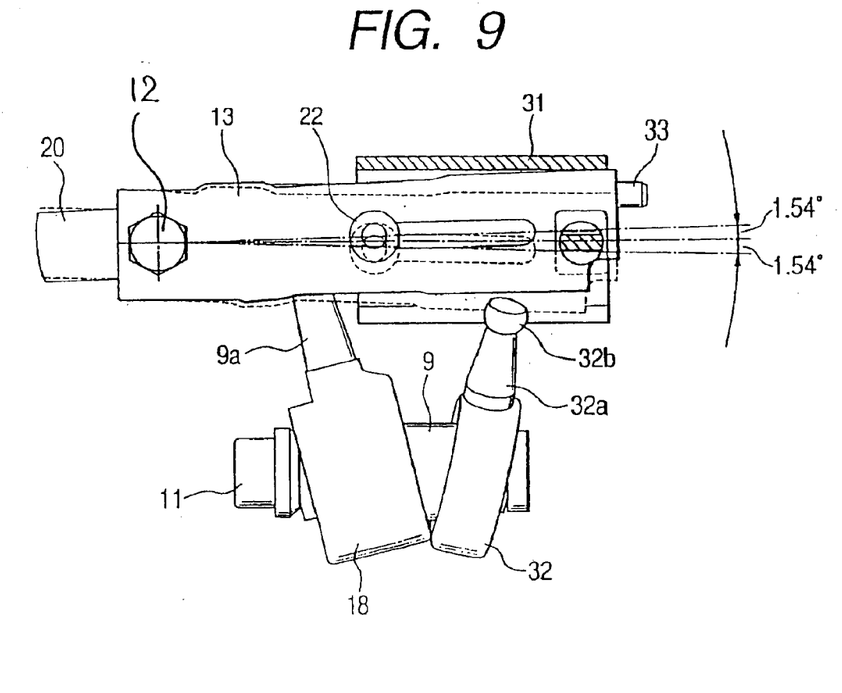
FIG. 9 is a cross-sectional view taken along a line E—E of FIG. 7.

FIG. 8 shows the change shaft 15 allowing the guide sleeve 13 to swing. The plunger 20, coupled in the guide sleeve 13, is swingable about the common axis of the axle bolts 12. The swing rollers 22 roll on the lower track 31a or the upper track 31b of the counterweight 31. In this respect, the counterweight 31 not only cancels the axial vibration of the plunger 20 but restricts the swing motion of the guide sleeve 13 and the plunger 20. According to this embodiment, the guide sleeve 13 and the plunger 20 are swingable about the common axis of the axle bolts 12 in both clockwise and counterclockwise directions in an angular range of approximately ±1.54 degrees with respect to the swing center thereof as shown in FIG. 9.

As the guide sleeve 13 is engaged with the counterweight 31 via the swing rollers 22, there is no direct interference between the guide sleeve 13 and the counterweight 31. As shown in FIG. 9, the guide sleeve 13 does not interfere with the inside wall of the counterweight 31 at the uppermost position (as indicated by solid line). When the guide sleeve 13 is positioned at the lowermost position (as indicated by a dotted line), no interference occurs as the lower part of the counterweight 31 is widely opened (refer to FIG. 7).

Sawing Operation with Linear Reciprocative Motion

Figure 10:
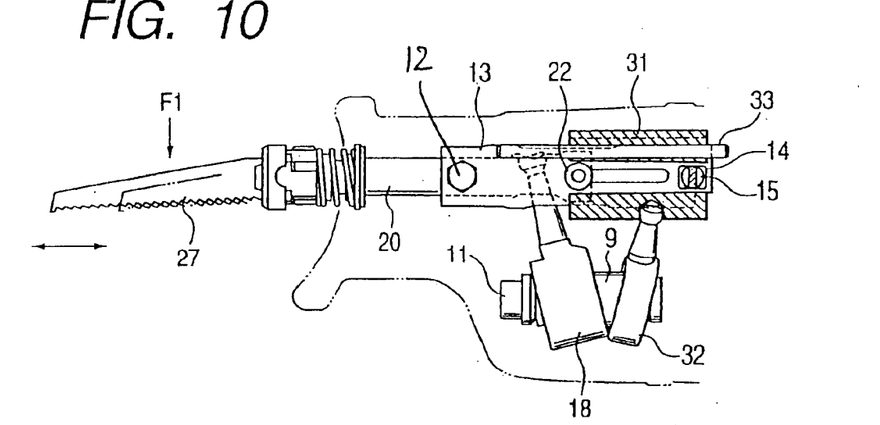
FIGS. 10 to 12 are views successively illustrating a linear cutting operation of the saber saw in accordance with the preferred embodiment of the present invention.
Figure 11:
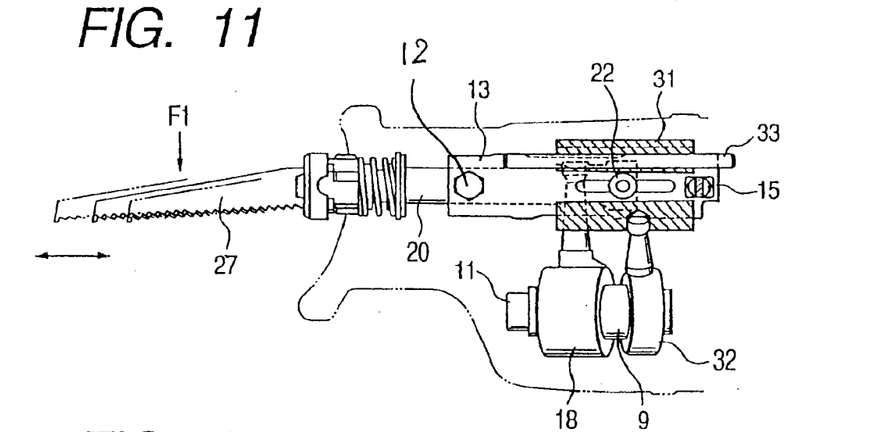
Figure 12:
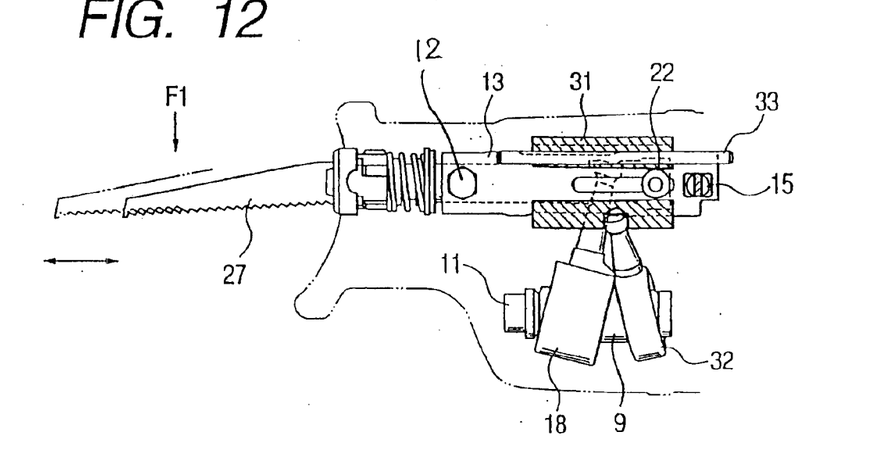

FIGS. 10 to 12 show sawing operation of the saber saw in a condition where the change shaft 15 locks the guide sleeve 13 to restrict the swing motion of the plunger 20. In this case, the change shaft 15 is in an upright position where the flat surfaces 15a of the change shaft 15 are substantially perpendicular to the axis of the guide sleeve 13. The upper and lower edges of the upright change shaft 15 are firmly engaged with the rectangular through holes 14 of the guide sleeve 13. The change shaft 15 inhibits swing motion of the guide sleeve 13 about the common axis of the axle bolts 12.

During sawing operation, a user applies a downward pressing force F1 to the saw blade 27 via the saber saw body. As the swing motion of the guide sleeve 13 is inhibited in this condition, the swing rollers 22 are not brought into contact with the track 31a or 31b of the counterweight 31. As a result, the plunger 20 and the saw blade 27 perform simple linear reciprocation. The simple linear reciprocation of the saw blade 27 is suitable for cutting a hard material such as a steel workpiece which generates a great reaction force.

Orbital Sawing Operation with Facedown Saw Blade

Figure 13:
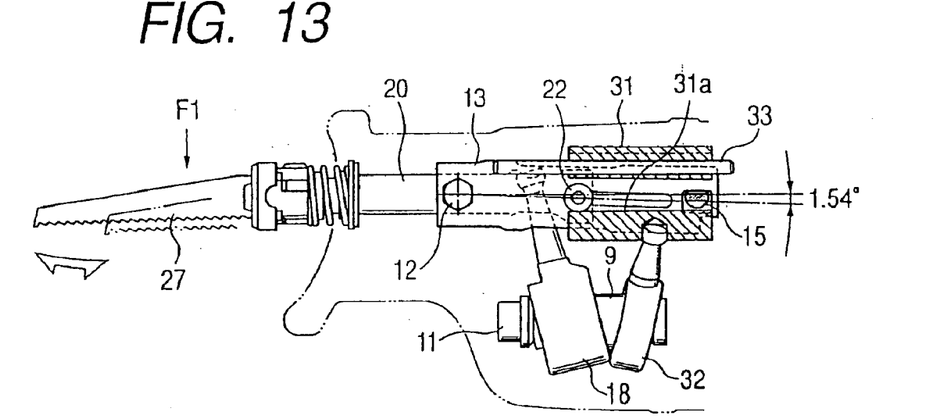
FIGS. 13 to 15 are views successively illustrating an orbital cutting operation of the saber saw in accordance with the preferred embodiment of the present invention.
Figure 14:
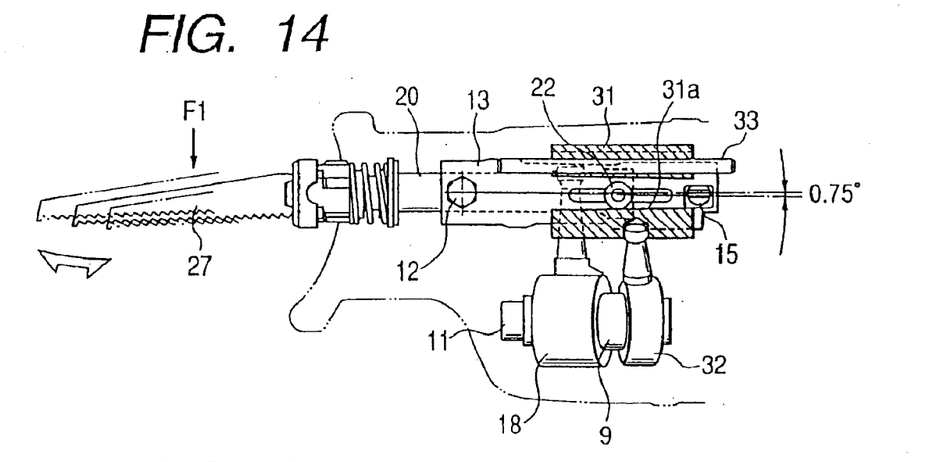
Figure 15:
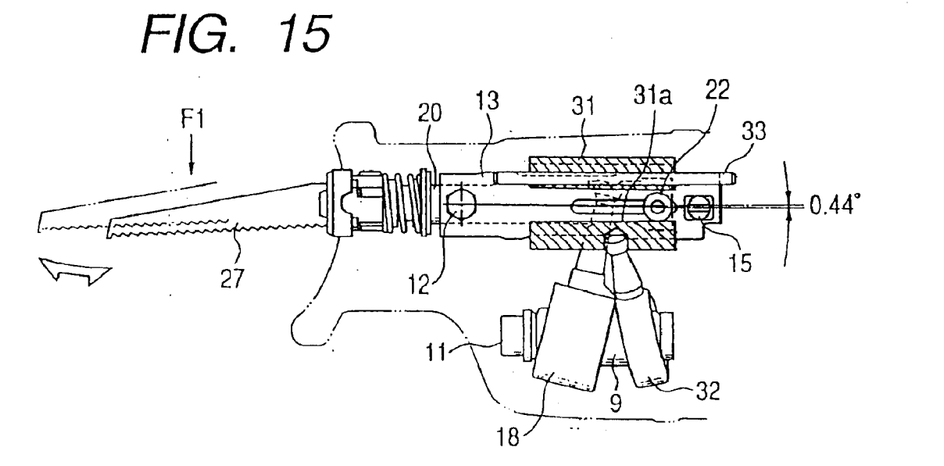

FIGS. 13 to 15 show the saw blade 27 normally attached to the plunger 20 with sawteeth facing downward. The saber saw is in a condition where the change shaft 15 unlocks the guide sleeve 13 to allow the swing motion of the plunger 20. In this case, the change shaft 15 is in a lying position where the flat surfaces 15a of the change shaft 15 are substantially parallel to the axis of the guide sleeve 13. The change shaft 15 is released from restriction of the rectangular through holes 14 of the guide sleeve 13. The change shaft 15 allows swing motion of the guide sleeve 13 about the common axis of the of the axle bolts 12.

During sawing operation, a user applies a downward pressing force F1 to the saw blade 27 via the saber saw body. The plunger 20 supporting the saw blade 27 receives an upward reaction force from a material to be cut and swings clockwise about the common axis of the axle bolts 12. The swing movement of the plunger 20 is transferred to the guide sleeve 13. The guide sleeve 13 lowers its rear end downward. The swing rollers 22 are depressed against the lower track 31a of the counterweight 31. The swing rollers 22, rolling along the lower track 31a, allow the guide sleeve 13 (together with the plunger 20) to reciprocate relative to the counterweight 31. As shown in FIGS. 13 to 15, during reciprocating in the axial direction, the guide sleeve 13 swings about the common axis of the axle bolts 12 in an angular range of 0.44 degrees to 1.54 degrees. As a result, the plunger 20 and the saw blade 27 perform orbital reciprocation according to which the saw blade 27 moves along an arc line as shown by an arrow in each of FIGS. 13 to 15. In this case, the counterweight 31 and the plunger 20 reciprocate in opposite directions with a phase difference of 180 degrees. Thus, the axial vibration of the plunger 20 can be canceled by the counterweight 31.

Orbital Sawing Operation with Faceup Saw Blade

Figure 16:
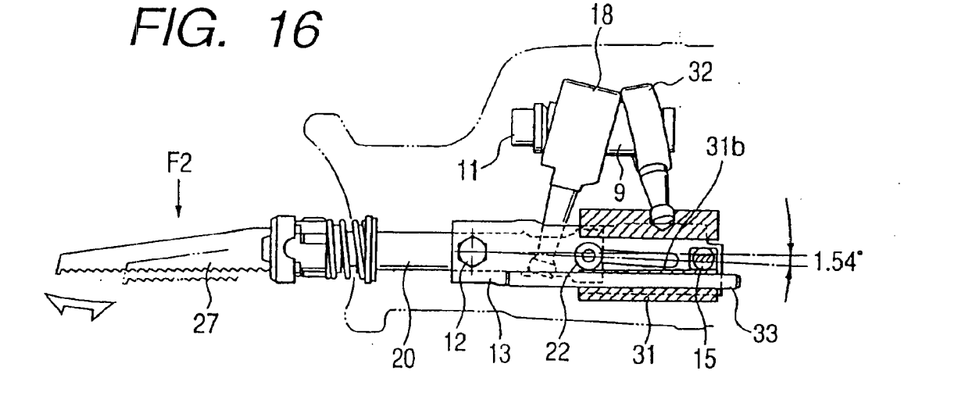
FIGS. 16 to 18 are views successively illustrating another orbital cutting operation of the saber saw in accordance with the preferred embodiment of the present invention.
Figure 17:
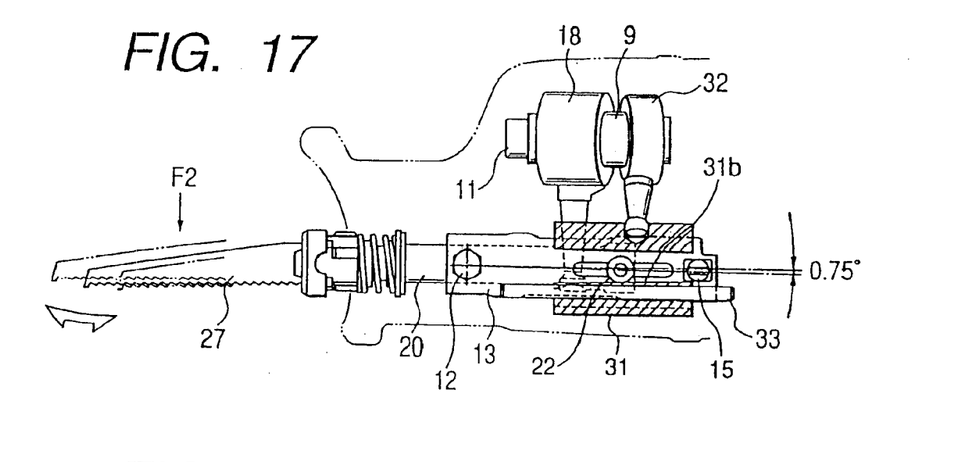
Figure 18:
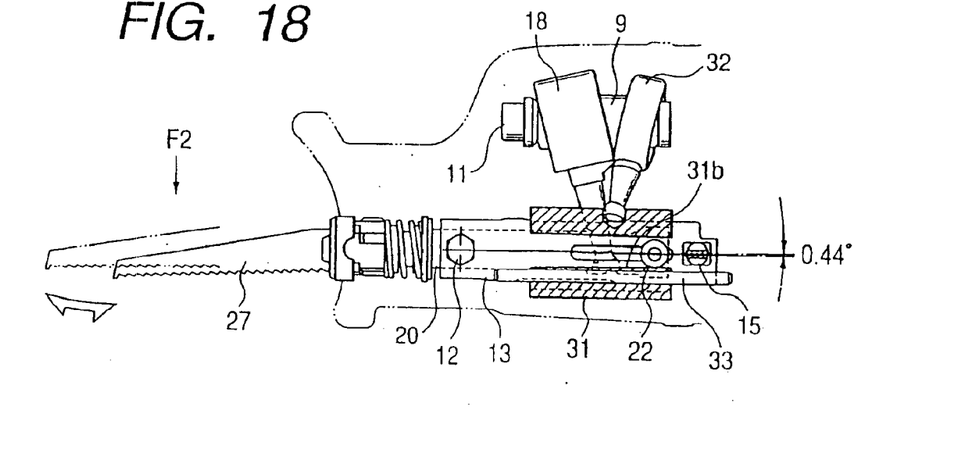

FIGS. 16 to 18 show the saw blade 27 inversely attached to the plunger 20 with sawteeth facing downward in a condition where the saber saw is held upside down by a user as shown in FIG. 2. The saber saw is in the condition where the change shaft 15 unlocks the guide sleeve 13 to allow the swing motion of the plunger 20. In this case, the change shaft 15 is in the lying position where the flat surfaces 15a of the change shaft 15 are substantially parallel to the axis of the guide sleeve 13. The change shaft 15 is released from restriction of the rectangular through holes 14 of the guide sleeve 13. The change shaft 15 allows swing motion of the guide sleeve 13 about the common axis of the axle bolts 12.

During sawing operation, a user applies a downward pressing force F2 to the saw blade 27 via the saber saw body. The plunger 20 supporting the saw blade 27 receives an upward reaction force from a material to be cut and swings clockwise about the common axis of the axle bolts 12. The swing movement of the plunger 20 is transferred to the guide sleeve 13. The guide sleeve 13 lowers its rear end downward. The swing rollers 22 are depressed against the other track 31b of the counterweight 31. The swing rollers 22, rolling along the track 31b, allow the guide sleeve 13 (together with the plunger 20) to reciprocate relative to the counterweight 31. As shown in FIGS. 16 to 18, during reciprocating in the axial direction, the guide sleeve 13 swings about the common axis of the axle bolts 12 in an angular range of 0.44 degrees to 1.54 degrees. As a result, the plunger 20 and the saw blade 27 perform orbital reciprocation according to which the saw blade 27 moves along an arc line as shown by an arrow in each of FIGS. 16 to 18. In this case, the counterweight 31 and the plunger 20 reciprocate in opposite directions with a phase difference of 180 degrees. Thus, the axial vibration of the plunger 20 can be canceled by the counterweight 31.

This invention may be embodied in several forms without departing from the spirit of essential characteristics thereof. The present embodiment as described is therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A saber saw comprising:

a housing for accommodating a motor;

a driven shaft rotatably supported by said housing and rotated by said motor;

a plunger capable of reciprocative motion with respect to said housing and having a front end to which a saw blade is attached, the plunger extending in a reciprocating direction thereof;

a first motion converting mechanism interposed between said driven shaft and said plunger for converting rotational motion of said driven shaft into the reciprocative motion of said plunger;

a counterweight causing reciprocative motion with respect to said housing;

a second motion converting mechanism interposed between said driven shaft and said counterweight for converting the rotational motion of said driven shaft into the reciprocative motion of said counterweight;

a guide sleeve extending in an axial direction of the plunger;

a swing roller movable along the guide sleeve and reciprocally movable together with the plunger;

a pivot member extending in a direction perpendicular to the guide sleeve, the guide sleeve being pivotally movable about an axis of the pivot member; and means for pivoting the guide sleeve within a predetermined angle about the axis of the pivot member;

wherein the guide sleeve is formed with an elongated hole extending in the axial direction and wherein the plunger includes a roller shaft extending through the elongated hole;

and wherein the swing roller comprises a first swing roller connected to one end of the roller shaft, and a second swing roller connected to another end of the roller shaft.

2. The saber saw as claimed in claim 1, wherein the guide sleeve is pivoted within a range of a pivot angle of from 0.44 degrees to 1.54 degrees.

3. The saber saw as claimed in claim 1, wherein a product of mass and reciprocally moving stroke of the counterweight is substantially identical with that of the plunger.

4. The saber saw as claimed in claim 1, wherein the elongated hole has a width slightly greater than a diameter of the roller shaft.

5. The saber saw as claimed in claim 1, further comprising a change shaft selectively engageable with the housing for preventing the guide sleeve from its pivoting motion, and selectively disengagable from the housing for permitting the guide sleeve to be pivotally moved.

6. A saber saw comprising:

a housing for accommodating a motor;

a driven shaft rotatably supported by said housing and rotated by said motor;

a plunger capable of reciprocative motion with respect to said housing and having a front end to which a saw blade is attached, the plunger extending in a reciprocating direction thereof;

a first motion converting mechanism interposed between said driven shaft and said plunger for converting rotational motion of said driven shaft into the reciprocative motion of said plunger;

a counterweight causing reciprocative motion with respect to said housing;

a second motion converting mechanism interposed between said driven shaft and said counterweight for converting the rotational motion of said driven shaft into the reciprocative motion of said counterweight;

a guide sleeve extending in the axial direction of the plunger and guiding the plunger;

a swing roller movable along the guide sleeve and reciprocally movable together with the plunger;

a pivot member extending in a direction perpendicular to the guide sleeve; and a moving mode changing means for changing a moving mode of the guide sleeve between a first moving mode for pivotally moving the guide sleeve about an axis of the pivot member within a predetermined pivot angle and a second moving mode for preventing the guide sleeve from being pivotally moved about the pivot member, the guide sleeve being pivotally moved during reciprocation of the plunger.

7. The saber saw as claimed in claim 6, wherein the guide sleeve is pivoted within a range of pivot angle of from 0.44 degrees to 1.54 degrees in the first moving mode.

8. A saber saw comprising:

a housing for accommodating a motor;

a driven shaft rotatably supported by said housing and rotated by said motor, a plunger capable of reciprocative motion with respect to said housing and having a front end to which a saw blade is attached, the plunger extending in a reciprocating direction thereof;

a first motion converting mechanism interposed between said driven shaft and said plunger for converting rotational motion of said driven shaft into the reciprocative motion of said plunger;

a counterweight causing reciprocative motion with respect to said housing, the counterweight providing a first track and a second track each extending in an reciprocating direction of the plunger, a second motion converting mechanism interposed between said driven shaft and said counterweight for converting the rotational motion of said driven shaft into the reciprocative motion of said counterweight; and a swing roller reciprocally movable together with the plunger along the extending direction of the first and second tracks, a combination of the first track, the second track and the swing roller selectively providing one of a first mode in which the swing roller is reciprocally moved out of contact from the first track and the second track, a second mode in which the swing roller is reciprocally moved in contact with the first track, and a third mode in which the swing roller is reciprocally moved in contact with the second track.

9. The saber saw as claimed in claim 8, wherein a product of mass and reciprocally moving stroke of the counterweight is substantially identical with that of the plunger.

10. The saber saw as claimed in claim 8, wherein the first track and the second track have longitudinal lengths extending in the axial direction of the plunger, each length being greater than a sum of reciprocally moving strokes of the plunger and the counterweight.

11. A saber saw comprising:

a housing for accommodating a motor, a driven shaft rotatably supported by said housing and rotated by said motor, a plunger capable of reciprocative motion with respect to said housing and having a front end to which a saw blade is attached, the plunger extending in a reciprocating direction thereof;

a first motion converting mechanism interposed between said driven shaft and said plunger for converting rotational motion of said driven shaft into the reciprocative motion of said plunger;

a counterweight causing reciprocative motion with respect to said housing;

a second motion converting mechanism interposed between said driven shaft and said counterweight for converting the rotational motion of said driven shaft into the reciprocative motion of said counterweight;

a guide sleeve extending in the axial direction of the plunger and guiding the plunger, the guide sleeve being pivotally movable during reciprocation of the plunger; and a swing roller movable along the guide sleeve and reciprocally movable together with the plunger, a combination of the plunger and the guide sleeve selectively providing one of a first mode in which the plunger is linearly reciprocally movable along the guide sleeve and a second mode in which the plunger is pivotally moved within a pivot angle ranging from 0.44 degrees to 1.54 degrees upon pivotal movement of the guide sleeve.

12. The saber saw as claimed in claim 11, further comprising a change shaft selectively engageable with the housing for preventing the guide sleeve from its pivotal movement, and selectively disengagable from the housing for permitting the guide sleeve to be pivotally moved.

13. The saber saw as claimed in claim 11, wherein the guide sleeve is formed with an elongated hole extending in the axial direction thereof;

and wherein the plunger includes a roller shaft extending through the elongated hole;

and wherein the swing roller comprises a first swing roller connected to one end of the roller shaft, and a second swing roller connected to another end of the roller shaft.

14. The saber saw as claimed in claim 13, wherein the elongated hole has a width slightly greater than a diameter of the roller shaft.

* * * * *